United States Patent

[11] 3,603,850

[72] Inventor John G. Kirschner
Northbrook, Ill.
[21] Appl. No. 876,969
[22] Filed Nov. 14, 1969
[45] Patented Sept. 7, 1971
[73] Assignee P. R. Mallory & Co. Inc.
Indianapolis, Ind.

[54] CERAMIC CAPACITOR WITH COUNTERELECTRODE
7 Claims, 6 Drawing Figs.

[52] U.S. Cl. .......... 317/261, 29/25.42
[51] Int. Cl. .......... H01g 3/06
[50] Field of Search .......... 317/242, 261, 101 CC; 29/25.42

[56] References Cited

UNITED STATES PATENTS

| | | | |
|---|---|---|---|
| 3,221,223 | 11/1965 | Thunberg | 317/261 X |
| 3,402,448 | 9/1968 | Heath | 317/261 X |
| 3,436,605 | 4/1969 | Landron | 317/101 (CC) X |
| 3,444,436 | 5/1969 | Coda | 310/101 (CC) |
| 3,456,170 | 7/1969 | Hatch | 317/261 X |

FOREIGN PATENTS

| | | | |
|---|---|---|---|
| 507,143 | 6/1939 | Great Britain | 317/261 |

OTHER REFERENCES

Davis IBM Tech. Dis. Bulletin Vol 5 , No 10 March 1963 p115
Dezaney IBM Tech. Dis. Bulletin Vol 9 No. 4 Sept. 1966. p 382 317–242.

*Primary Examiner*—E. A. Goldberg
*Attorneys*—Richard H. Childress, Robert F. Meyer, Henry W. Cummings and Carter C. Ells

ABSTRACT: A ceramic capacitor, particularly a miniature ceramic chip capacitor which can be varied in capacitance, primarily for use in hybrid integrated circuits. The capacitor's metallic electrodes are external and coplanar, being separated by a recess in the ceramic body on one surface of the body, and on the oppositely opposed surface of the body is an external metallic counterelectrode. The capacitor can be varied in capacitance by varying the surface area of the counterelectrode.

PATENTED SEP 7 1971 3,603,850

INVENTOR
JOHN G. KIRSCHNER

CERAMIC CAPACITOR WITH COUNTERELECTRODE

This invention relates to ceramic chip electrical components and, more particularly, to miniature ceramic chip capacitors which can be varied in capacitance.

Miniature chip capacitors and other chip components are useful primarily in connection with hybrid integrated circuits and microminiaturized printed circuits. Ceramic chip capacitors provide higher capacitance values than those attainable in monolithic integrated circuits. In order to meet its intended uses, a chip capacitor should enclose a high electrical capacitance within a small volume; it should also be capable of simple and inexpensive manufacture. Additionally, hand positioning and assembly of the capacitors into a circuit should be eliminated to the greatest possible extent. Furthermore, since such components are essentially custom made in batches to a circuit manufacturer's capacitance, voltage, size and shape requirements, tooling and setup costs should be low.

Such capacitors as the foregoing, however, must be manufactured with fairly exacting capacitance requirements or when used, for example, in tuned circuits as filters, oftentimes require that the coil of the circuit be tuned since the capacitor has a fixed capacitance value. In such instances, it can be appreciated that the ability to vary the capacitance of the capacitor would represent a decided impr^vement and advantage in this art.

It is therefore an object of the present invention to provide miniature ceramic chip capacitors which, in addition to other advantages, can be varied in capacitance.

It is another object of the present invention to provide miniature chip capacitors having coplanar electrodes for direct assembly onto printed or integrated circuits and which, in addition to other advantages, can be varied in capacitance.

Other objects and advantages, as well as modifications obvious to one skilled in the arts to which the invention pertains, will become apparent from the following description and claims taken in conjunction with the accompanying drawings, in which:

In general, the present invention is directed to a capacitor having a body containing a ceramic material and a plurality of coplanar surfaces on one side thereof with a metallic electrode layer surface overlying each of the coplanar surfaces, and a metallic counterelectrode layer surface on the oppositely opposed side of the body with the surface area of the counterelectrode being variable in order to vary the capacitance of the capacitor, all as more fully discussed hereinafter.

The ceramic materials which can be employed include one or more ceramic constituents such as barium, calcium, lead and/or strontium titanates with or without the addition of zirconates of the above-mentioned metals and titanium dioxide. These usually produce ceramics of relatively high dielectric constant generally desirable for relatively high capacitance capacitors. For certain purposes, ceramics of much lower dielectric constant may be desirable and typical of such materials are aluminum oxide and magnesium orthosilicate. Generally preferred, however, is a ceramic of the barium titanate based type.

Figures 1, 2, 3:
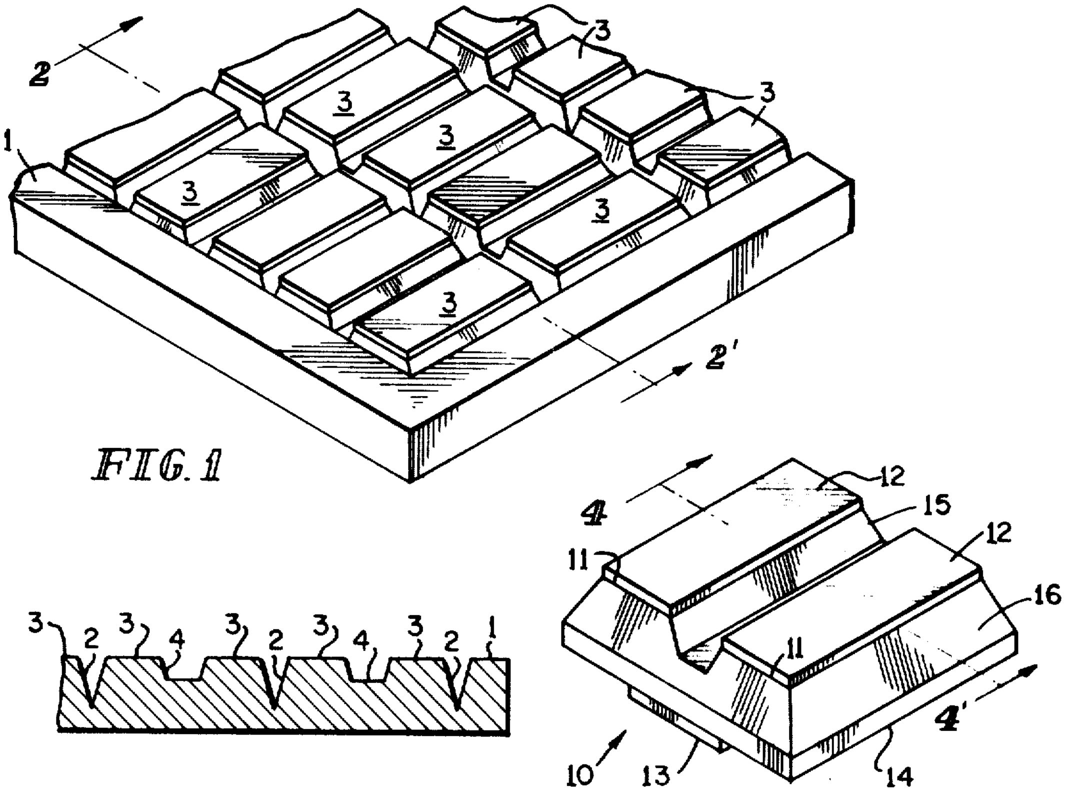
FIG. 1 is a perspective view of a partially completed ceramic embodiment of the present invention.
FIG. 2 is a cross-sectional view of a partially completed embodiment taken along the line 2—2' of FIG. 1.
FIG. 3 shows an individual chip capacitor unit diced from the wafer of FIG. 1 and containing a counterelectrode.

Referring to the drawings, and more particularly FIGS. 1 and 2, a partially completed wafer 1 is shown containing a plurality of coplanar surfaces 3. This embossed or formed wafer 1 contains, as shown, a plurality of individual capacitors, the boundaries of which are defined by reticulate grooves 2 being substantially V-shaped in order to provide cleavage lines for dicing the wafer, as will be discussed hereinafter. Within each capacitor unit or individual capacitor the coplanar surfaces 3 are separated by shallow recesses or substantially U-shaped grooves 4.

The formed or embossed wafer can be prepared by many and various methods which include first forming a ceramic film from a slurry by casting, extrusion, spraying or other means, cutting the film into units and stacking such if desired to achieve a particular thickness and then embossing a surface of the film with an embossing die having a face containing the grooved and recessed pattern. Other methods include forming a fine-textured ceramic slurry and then drying to a powder such as by spray drying in any conventional spray-drying equipment. The formed or embossed wafer is then prepared by filling a cavity or die having the general shape as the wafer previously described including a pattern which, when the powder is pressure pressed, results in a surface of the wafer having the coplanar surfaces and the reticulate grooves.

The formed or embossed wafer is further processed according to conventional procedures including heating to burn out the binder, if used, and sintering or firing for maturing the wafer.

Metals which can be employed as electrodes and counterelectrodes include noble metals and their alloys such as palladium, platinum, gold and silver. Metal electrodes and counterelectrodes can be applied to the matured ceramic wafer by many and various methods which include coating the desired surface of the ceramic wafer with a paste or finely divided dispersion of the metal by a silk screen process and then drying or by screening or open mesh methods utilizing metallic paints and pastes and then drying, or by direct application methods which include forming a metallic layer by sputtering, electroless deposition, vapor deposition and the like.

The individual capacitors can be diced or separated from each other for packaging and shipment. Placing the wafer on a soft rubber pad and passing a hard roller of small diameter thereover breaks the wafer cleanly, along the reticulate grooves. A piece of tape under the wafer prevents the small pieces from scattering as they are broken. As has been mentioned, the absence of compaction in the vicinity of these grooves and their sharp V-shape promote cleavage therealong. The resulting edges appear smooth and substantially perpendicular to the base surface of the capacitor. Conversely, no evidence of fracture has been observed in the U-shaped medial grooves or shallow recesses.

Figure 4:
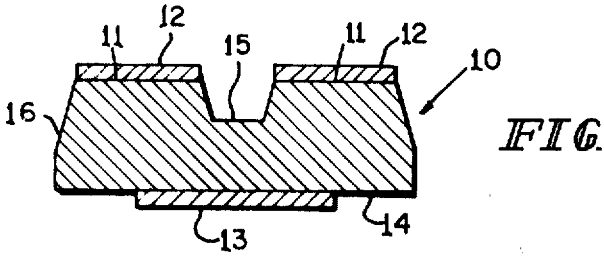
FIG. 4 is a cross-sectional view of a capacitor embodiment taken along the line 4—4' of FIG. 3.
Figure 5:
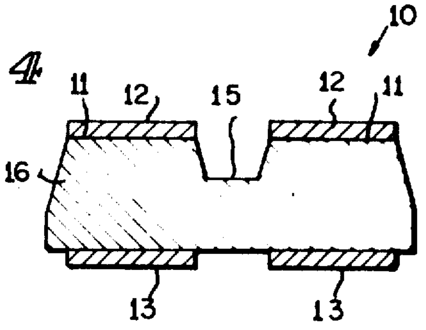
FIG. 5 is a cross-sectional view of another capacitor embodiment.

Referring now to FIGS. 3, 4 and 5 which show an individual capacitor unit 10 of the present invention. The capacitor body of ceramic material 16 has a pair of coplanar surfaces 11, separated by a shallow recess 15, and covered by metallic electrode layers 12 on one side thereof and a metallic counterelectrode layer 13 on the oppositely opposed side of the unit.

The metallic electrode layers are preferably coplanar and although such can vary in surface area, it is preferred that they be substantially similar in surface area. The metallic counterelectrode can cover substantially all of the opposed side 14 of the unit or a portion of such side. In addition, it can be separated into individual portions such as in the manner shown in FIG. 5. The coplanar surfaces 11 and the opposed side 14 of the capacitor are substantially parallel. By varying the surface area of the counterelectrode which covers or overlays the opposed side, it is possible to vary the capacitance of the capacitor within limits. In general, the capacitance increases as the surface area of the counterelectrode increases. Preferably, the counterelectrode surface area should be positioned on the opposed side in such a manner that it is substantially oppositely opposed to the coplanar electrodes in proportion to the surface area of the coplanar electrodes.

In some instances, it is desirable to completely cover the opposed side with a metallic layer and then abrade or mechanically grind the metalic layer to a surface area which corresponds to a desired capacitance value for the capacitor. In this manner, it is possible to mass produce the capacitors and thereafter to individually adjust the capacitance to a desired value.

Several different types of ceramic chip capacitors having a pair of coplanar silver electrodes were compared in capacitance values. The capacitors were rectangular in shape 0.125 inch × 0.187 inch and 0.020-inch thick. Some capacitors did not have counterelectrodes while others had their complete surface area covered with a silver counterelectrode. The following table reports the results.

TABLE I

| Type Capacitor (k) | No Counterelectrode Avg. Capacitance (PF) | Full Counterelectrode Avg. Capacitance (PF) |
|---|---|---|
| 35 | 1 | 4 |
| 180 | 3.8 | 15 |
| 2,000. | 33 | 150 |
| 4,000. | 50 | 220 |

As can be appreciated from the foregoing, the capacitance value increased when fully counterelectroded as compared with no counterelectrode. In addition, the capacitance can be varied between the values reported by varying the surface area of the counterelectrode.

Figure 6:
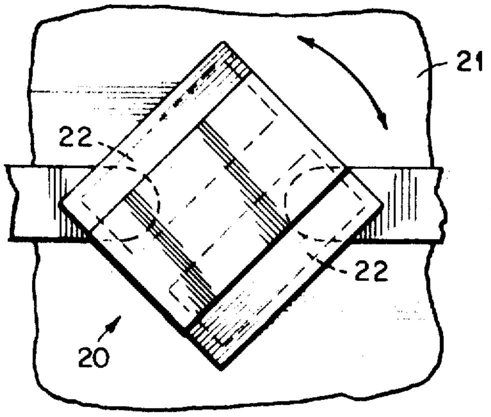
FIG. 6 shows the capacitor embodiment of FIG. 3 mounted in a circuit.

FIG. 6 shows a completed chip capacitor 20 positioned on the substrate 21 of a portion of hybrid integrated circuit or a miniature printed circuit. The capacitor 20 is placed face downward on the substrate 21 so that the electrodes 22 meet the contact pads of the circuit; these elements are then soldered or joined by other conventional means. To avoid the handling of a multitude of small pieces, automatic means are commonly used in the industry to feed, position and orient such components. Rotational orientation about an axis perpendicular to the plane of the component may conveniently be accomplished with guides operating from a vibratorv feeder. It will be noted from FIG. 5 that a quadrantal ambiguity in rotation of a square component in the direction of the arrow may be rendered harmless by diagonal mounting on the pads. A much more severe problem occurs in attempting to distinguish between the upper and lower surfaces for orientation purposes. Because conventional chip components are featureless except for thin contact stripes deposited on one face, the vacuum holder usually employed for positioning cannot differentiate between these two surfaces without some form of sensing equipment. The present unit, however, has a substantially deep groove running the length of the surface to be placed downward on the substrate. Therefore, a vacuum holder cannot pick up the unit except by the face because of air leakage through the groove. Units thus rejected for improper presentation then return to the vibratory feeder for another pass. Accordingly, a major advantage of components fabricated in the present manner resides in the fact that the means most commonly used for automatic parts placement may be made to serve without auxiliary equipment as an orientation discriminator. It is also possible, of course, to provide a ridge on a handling machine or feeder, the ridge being keyed to the groove for proper orientation of the component; furthermore, the difference in light-reflective characteristics between the layers and the surface will allow the use of a photoelectric means as an orientation discriminator.

Chip capacitors according to the invention may vary greatly in size. A capacitor of the present invention can, for example, be about 15-mils thick. When the film-forming process is used, generally a film thickness of about 4 to 7 mils is obtained. Therefore, the filmed wafers can be stacked to form a laminated wafer of the desired thickness. A capacitor of the present invention can, for example, be about 60-mils square and such typically has a capacitance range of approximately 50 picofarads at a design rating of 50 volts to 2,000 picofarads at 3 volts. Electrical parameters of the unit may be adjusted slightly in a number of ways. Changing the outer dimensions or the width of the grooves will of course influence to some degree the capacitance; it has been noted that such dimensional changes involve merely the substitution of a different embossing die.

If desired, electrical leads can be connected to the electrodes and counterelectrode by any conventional means such as soldering and the like and in addition, the entire component may be coated or encapsulated with a protecting material such as a thermosetting plastic.

For particular methods for processing capacitors reference can be made to the methods disclosed and described in copending application Ser. No. 823,667 filed May 12, 1969 which is incroporated herein by reference.

I claim:

1. A capacitor comprising a body containing ceramic material having a plurality of coplanar surfaces separated by a shallow recess on one side thereof with a metallic electrode layer surface overlying each of said coplanar surfaces, and a metallic counterelectrode layer surface on the oppositely opposed side of said body whereby the surface area of said counterelectrode can be varied to vary the capacitance of the capacitor.

2. A capacitor according to claim 1, wherein said coplanar surfaces and said oppositely opposed side are substantially parallel.

3. A capacitor according to claim 2, wherein said capacitor has a pair of coplanar surfaces.

4. A capacitor according to claim 3, wherein said counterelectrode surface area is substantially proportional to the surface area of said electrodes.

5. A process for preparing a capacitor of claim 1 comprising forming a wafer containing a plurality of capacitor units separated by a substantially V-shaped groove, maturing said wafer, applying metallic electrode layers to said coplanar surfaces and a metallic counterelectrode layer on said oppositely opposed side, dicing said wafer to separate said capacitor units into individual capacitors, and varying the surface area of said counterelectrode to adjust the capacitance of the capacitor to a predetermined capacitance value.

6. A process according to claim 5, wherein said surface area of said counterelectrode is varied by abrading the counterelectrode.

7. A process according to claim 6, wherein the counterelectrode is abraded in such a manner to achieve a surface area thereof substantially proportional to the surface area of said electrodes.